Figure 1:
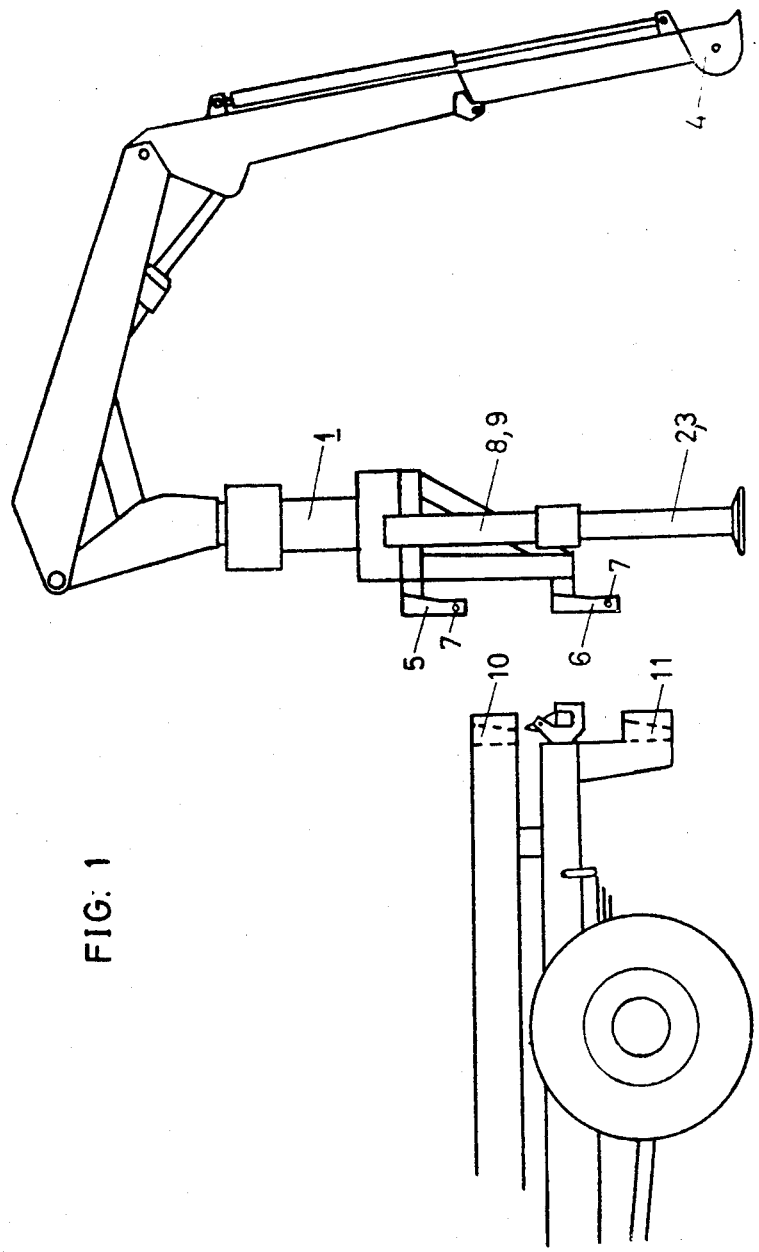

United States Patent [19]

Frisk

[11] 3,734,319

[45] May 22, 1973

[54] METHOD AND DEVICE FOR DETACHABLE COUPLING TOGETHER OF IMPLEMENT AND VEHICLE

[75] Inventor: Knut Olov Frisk, Gavle, Sweden

[73] Assignee: AB Tico, Gavle, Sweden

[22] Filed: Dec. 16, 1970

[21] Appl. No.: 98,707

[30] Foreign Application Priority Data

Dec. 23, 1969 Sweden ............................. 17915/69

[52] U.S. Cl. ................................. 214/131, 214/515
[51] Int. Cl. ................................................. B60 1/64
[58] Field of Search ..................... 214/131, 140, 138, 214/620, 621, 515

[56] References Cited

UNITED STATES PATENTS

| | | | |
|---|---|---|---|
| 2,675,139 | 4/1954 | Mercier et al. | 214/621 X |
| 2,796,186 | 6/1957 | Arnot | 214/621 |
| 2,944,689 | 7/1960 | Arnot | 214/620 |
| 3,081,891 | 3/1963 | Przybylski | 214/138 R |
| 3,220,487 | 11/1965 | Pilch | 214/131 |
| 3,275,163 | 9/1966 | Schaeff | 214/138 RX |

*Primary Examiner*—Robert J. Spar
*Attorney*—Irving M. Weiner

[57] ABSTRACT

Method of detachably coupling together a loading implement with coupling means and supporting legs, and a vehicle, said coupling means being essentially in a vertical direction detachably couplable in self-centering engaging means located on the vehicle, the method consisting in the vehicle being driven up to the implement set up on the supporting legs, that coupling and engaging means are brought into a roughly pre-centered starting coupling position, that the coupling means on the implement are raised or lowered, with the aid of the supporting legs, relative to the engaging means for effecting the coupling, said means being automatically centered in relation to one another, brought into engagement and detachably held together.

5 Claims, 2 Drawing Figures

METHOD AND DEVICE FOR DETACHABLE COUPLING TOGETHER OF IMPLEMENT AND VEHICLE

This invention relates to a method and to a device for detachable coupling of a loader, bucket, crane or other implement to a vehicle, the implement having one or more supporting legs and coupling means, for bringing into engagement with engaging means arrangeable on the vehicle.

Through the Swedish application open to public inspection Pat. No. 307,106 a device is known for use with tractors having a stand carrying a lifter and preferentially surrounding the fore end of the tractor, the lifter and stand being detachably fitted as a unit to the tractor body by means of manually adjustable locking means. The manually adjustable locking means consist of means carried on the stand on both sides of the tractor body and rotatable with knobs, the latter means having radially projecting, T-shaped shoulders which mate with slotted hollow sections in segmented coupling parts attached to supporting plates joined to the tractor body. This involves the disadvantage that the dismantlable loader must be raised from or lowered to the ground when being fitted to and dismantled from the vehicle. The coupling of the loader to the tractor requires a fairly considerable effort and can hardly be done by one man.

Through the Swedish Pat. No. 194,662 a method is known of detachably coupling a crane to a truck, a tractor or the like, the crane being furnished with a supporting and coupling means fixedly attachable to its stand and detachably engageable and lockable in an engaging means fixedly attachable to the rear of the vehicle, the vehicle then being driven up to a crane placed at ground level so that the supporting and coupling means and the engaging means are brought into engagement with one another, whereby the crane is carried by the vehicle.

Through the same patent a device is also known for detachable coupling of a crane to a truck, a tractor or the like in the manner described above, the crane having a supporting and coupling means fixedly attachable to its stand and detachably engageable and lockable in an engaging means fixedly attachable to the rear of the vehicle, whereby the crane, if required, can be rapidly fitted to and removed from the truck. The supporting and coupling means consists of a bracket fixedly attachable to the underside of the stand and having two supporting arms projecting in parallel from the bracket. The engaging means consists of two longitudinal sleeves fitted to the vehicle horizontally, into which sleeves the supporting arms are insertable and lockable.

This known method has the disadvantage of being usable only when the crane coupling means are at the same level as the engaging means on the truck. If, for example, the crane has stood for a long time on a soft base and has sunk down beyond a given depth, its coupling to the vehicle is no longer possible unless the crane coupling means are raised to the proper height. Since a crane of this kind weighs around 1 ton, raising can be done only with difficulty or through the adoption of special measures. Another disadvantage is that, on coupling to the crane, the vehicle must be aligned fairly exactly, which requires precision driving by the truck driver.

To eliminate this disadvantage a stand-mounted detachable crane has become known through the Swedish application open to public inspection Pat. No. 308,381 for a vehicle such as a truck, trailer or tractor, the stand having two parallel arms. The arms are joined together by a yoke or the like and their free ends can be pushed by means of, for example, a hydraulic piston cylinder into locking sleeves on the vehicle.

The truck is backed up to the detached crane, so as to assume the correct position laterally, and is stopped at a distance of not more than about 200 mm from it. The hydraulic piston cylinder is connected to the vehicle's pump and the crane with stand can then be hydraulically raised and aligned by lengthening or shortening the supporting legs and lowering of the loading arm, after which the arms of the bracket are pushed into the locking sleeves and locked in them.

This device is complicated in that, for its operation, it requires supporting legs for vertical alignment and an additional hydraulic piston cylinder for horizontal insertion of the bracket arms into the horizontal locking sleeves.

The purpose of the present invention is to provide an improved and simplified method of detachably coupling implements to vehicles, for which only a minimum of precision driving and simple measures are required. The coupling operation is feasible for one person alone and is effected with the simplest possible means. The invention also provides a device for a detachable coupling together an implement and vehicle according to the method proposed.

The new method of detachably coupling to a vehicle a loader, bucket, crane or other implement, preferentially with supporting legs, is characterized according to the invention in that the implement is furnished with one or more coupling means which, essentially in a vertical direction, are detachably coupleable, lockable and self-centering in engaging means attachable to the vehicle, that the vehicle is driven up to the implement set up on supporting legs and possibly other supports, that coupling and engaging means are brought into a roughly pre-centered position for coupling, that the coupling means on the implement are raised or lowered relative to the engaging means on the vehicle, e.g., with the aid of supporting legs, for coupling to them, the coupling and centering units being automatically centered in relation to one another, brought into engagement, locked and detachably held to one another. The raising or lowering may suitably be done hydraulically after the implement, in its starting position, and not yet coupled to the vehicle, has been connected to a source of hydraulic pressure on the vehicle.

A device for detachable coupling of a loader, bucket, crane or other implement to a vehicle, the implement preferably having one or more supporting legs and one or more coupling means, designed to be brought into engagement with coupling means placed on the vehicle, for implementation of the method according to the invention, is characterized according to the invention in that the implement has one or more coupling means, preferably at two separate levels, tapering in the vertical direction and detachably coupleable to likewise tapering engaging means fitted to the vehicle; that the engaging and coupling means are lockable on one another, and that the coupling means can be raised and lowered in relation to the engaging means, or vice versa, for example with the aid of supporting legs. The supporting legs should preferably be extensible and withdrawable and capable of connection to a hydraulic pressure source on the vehicle.

Figure 2:
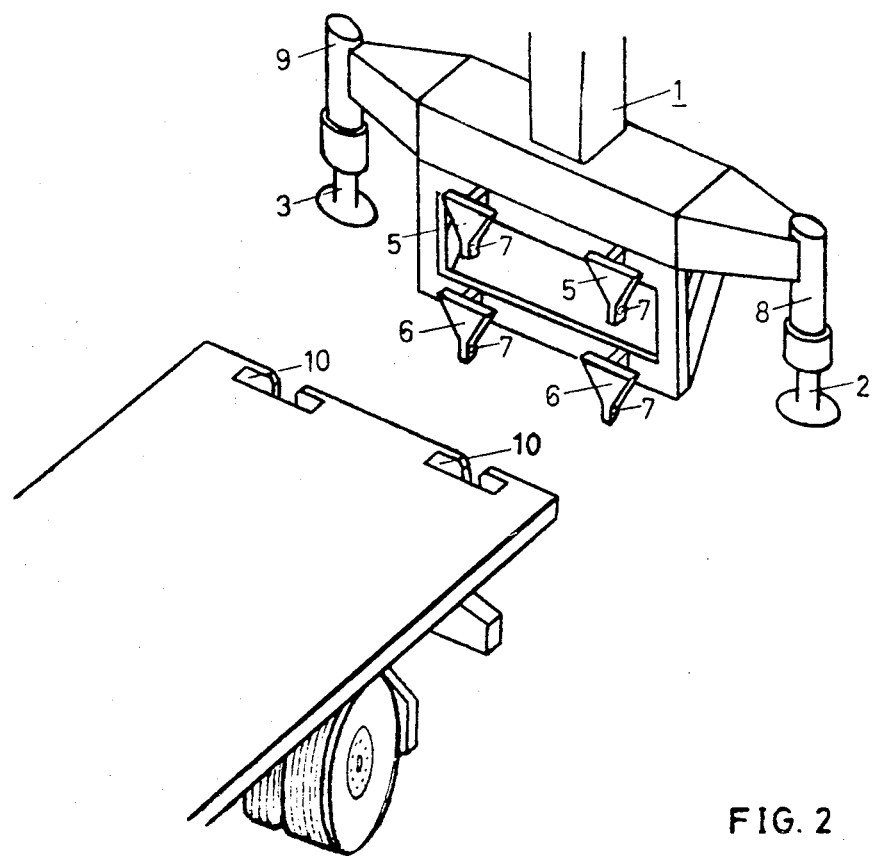

Further details of the invention will be apparent from the following description of one embodiment of the invention with reference to the attached drawings, in which FIG. 1 shows a vehicle and an implement for coupling together according to the invention, viewed from the side, and FIG. 2 parts of the object in FIG. 1 in perspective view.

The implement 1 — here a loader arm with bucket — is set up apart from the vehicle on three supports, namely two supporting legs 2, 3 and the bucket 4. Although the drawing illustrates a loader arm type of implement, it is to be understood that the present invention is generally applicable to coupling systems wherein the implement is vertically swingable and pivotally attached to a vertically extending base, the base having legs connected thereto and outwardly spaced therefrom. Thus, the present invention contemplates a method and device for cantilever-type detachable coupling. The Implement has four vertically tapering coupling means 5, 6, each two of which are at the same height, one pair 5 above the other pair 6. The number of coupling means and heights may naturally vary. The form of the coupling means, furthermore, is not tied to the embodiment shown in the drawing. They may, for example, have the form of a cone, pyramid, truncated cone or pyramid, tetrahedral, and so on. They may taper either upwards or, as shown in the drawing, downwards. In a preferred embodiment of the present invention the coupling means are T-shaped and extend outwardly from the base of the implement. In the embodiment shown the coupling means have at the bottom openings 7 designed to lock the coupling means to the engaging means through insertion of a bolt or the like. This lock can, of course, be effected in different ways well known to the specialist. The supporting legs 2, 3 are here intended to be raised and lowered. This can advantageously be done hydraulically by hydraulic cylinders 8, 9 placed on the supporting legs and uniting the latter with the implement.

At a suitable point on the vehicle, e.g., on the front, on the front end of the platform, on the side or — as shown in the drawings — at the rear end of the platform, there are a number of vertically tapering engaging means 10, 11 corresponding to the number of coupling means. As regards the form of these engaging means the same applies as was stated above in respect of the form of the coupling means. In the preferred embodiment of the present invention the engaging means are complementarily configured to the coupling means and, therefore, comprises a complementary downwardly extending opening. The engaging means, also, includes a transverse slot at the top of the opening to restrain the T-shaped coupling means from horizontal shifting. Thus, the coupling means are insertable into and within the engaging means. If the engaging and coupling means are arranged at different heights, the advantage is also gained in a surprising manner that the lower engaging means 11, apart from their function according to the invention, may also form an underdriving protection, which prevents the bonnet of a passenger car, should it drive into the truck from behind or from the side, from coming under the truck so that, for example, the truck platform is forced into the passenger car at the level of the driver's face.

When the implement and the vehicle are to be coupled together, the vehicle is driven up to the implement, set up on the supporting legs and bucket, so that the coupling and engaging means are brought into a position roughly pre-centered laterally and in the driving direction. In conjunction therewith the implement, still in starting position and not yet coupled to the vehicle should preferably be connected to a hydraulic pressure source on the vehicle. The implement can then be raised or lowered with the aid of the supporting legs. It is naturally conceivable, instead, to raise or lower the engaging means while the coupling means remain stationary. Should it prove that the implement, viewed from the side, stands askew, its angle can be corrected by, for example, extension or withdrawal of the extension boom of the loader arm or other hydraulic cylinders on the loader arm, so that the coupling means 5 assume the same position in relation to the engaging means 10 as the coupling means 6 assume in relation to the engaging means 11. When this roughly pre-centered starting position for coupling has been reached, the implement is lowered with the aid of the supporting legs, whereupon the coupling and engaging means are automatically centered in relation to one another owing to their tapered form, brought into engagement, locked and detachably held together. Naturally this coupling may for example, also be thought to take place by raising the implement and thus bringing the coupling means into engagement with the engaging means from below and locking them.

Through this invention the advantage is gained that the vehicle need not be driven or backed "into engagement" between the coupling and engaging means, but need merely be moved so that the engaging and coupling means are roughly opposite one another. The existing supporting legs can also be used for coupling and uncoupling. The coupling is accomplished by means of an easily effected vertical movement, and finally an under-driving protection is obtainable without extra cost.

Furthermore all the advantages of detachable implements are retained, such as increased loading capacity of the vehicle, usability of the implement for several vehicles, lower taxation class owing to lower vehicle weight, lower height of vehicle owing to the fact that the implement need not be carried during transport, etc.

What I claim is:

1. Method of detachable coupling together a loader, bucket, crane or other implement, in cantilever fashion to the end of a vehicle, said implement being vertically swingable and being pivotally attached to a vertically extending base and further being provided with a pair of downwardly extending legs, each leg of said pair being respectively spaced outwardly of the base, characterized in that the base of the implement is furnished with one or more coupling means, which essentially in a vertical direction, are detachably coupleable, lockable and self-centering in complementary engaging means located in vertically spaced relationship on the end of the frame of the vehicle, said coupling means on said base extending outwardly therefrom and being T-shaped in configuration, said complementary engaging means having a complementary downwardly extending opening with a transverse slot at the top of said opening for restraining said T-shaped coupling means from horizontal shifting, that the vehicle is driven up to the implement set up on the supporting legs, that the coupling and engaging means are brought into a roughly pre-centered starting position for coupling, that the coupling means on the implement are lowered by the supporting legs relative to the engaging means on the vehicle for effecting the coupling, the coupling and engaging means being automatically centered in relation to one another, brought into engagement, locked and detachably held together, and wherein the coupling means is insertable into and within the engaging means.

2. Method according to claim 1, characterized in that the raising and lowering are effected hydraulically after the implement, in starting position and not yet coupled to the vehicle, has been, connected to a hydraulic pressure source on the vehicle.

3. Device for detachable coupling of a loader, bucket crane or other implement in cantilever fashion to the end of a framed vehicle, the implement being of the type which is vertically swingable and pivotally attached to a vertically extending base and which includes a pair of downwardly extending legs, each leg of the pair being respectively spaced outwardly of the base, wherein the device further comprises:

vertically tapering T-shaped coupling means furnished on the base of the implement and disposed at two heights, the coupling means extending outwardly from the base;

engaging means complementary to the coupling means located in vertically spaced relationship on the end of the frame of the vehicle and having a complementary downwardly extending opening with a transverse slot at the top of the opening for restraining the coupling means from horizontal shifting; and the coupling means being essentially, in a vertical direction, detachably coupleable, lockable and self-centering in the engaging means such that the vehicle is driven up to the implement set up on the supporting legs, that the coupling and engaging means are brought into a roughly pre-centered starting position for coupling, that the coupling means and the implement are lowered by the supporting legs relative to the engaging means on the vehicle for effecting the coupling, the coupling and engaging means being automatically centered in relation to one another, brought into engagement, locked and detachably held together, and wherein the coupling means is insertable into and within the engaging means.

4. Device according to claim 3, characterized in that the supporting legs are extensible and withdrawable by means of hydraulic cylinders and are connectable to a hydraulic pressure source on the vehicle.

5. Device according to claim 3, characterized in that one or more of the engaging means are arranged on the vehicle at a height such that they at the same time serve as under-driving protection.

* * * * *